(12) United States Patent
Cai et al.

(10) Patent No.: US 7,454,200 B2
(45) Date of Patent: Nov. 18, 2008

(54) PERSONAL HANDYPHONE SYSTEM COMPONENT EMPLOYMENT OF PREPAY TELEPHONE SERVICE SYSTEM COMPONENT TO ALLOW USER EMPLOYMENT OF WIRELESS TELEPHONE SERVICE SUBSEQUENT TO PURCHASE THEREOF

(75) Inventors: Yigang Cai, Naperville, IL (US); Xu Chen, Qing Dao (CN); Jennifer Cong Fang He, Shandong (CN); Hai Guang Mu, Qing Dao (CN)

(73) Assignee: Lucent Technologies Inc., Murray Hill, NJ (US)

( * ) Notice: Subject to any disclaimer, the term of this patent is extended or adjusted under 35 U.S.C. 154(b) by 209 days.

(21) Appl. No.: 10/293,856

(22) Filed: Nov. 13, 2002

(65) Prior Publication Data

US 2004/0092246 A1 May 13, 2004

(51) Int. Cl.
*H04M 11/00* (2006.01)
(52) U.S. Cl. .................................................. 455/419
(58) Field of Classification Search ................. 455/406, 455/407, 408, 419
See application file for complete search history.

(56) References Cited

U.S. PATENT DOCUMENTS

| | | | |
|---|---|---|---|
| 6,434,379 B1 * | 8/2002 | Despres et al. | 455/406 |
| 6,480,588 B1 * | 11/2002 | Donovan | 379/114.2 |
| 6,654,600 B1 * | 11/2003 | Pollak et al. | 455/405 |
| 6,907,116 B2 * | 6/2005 | Ung et al. | 379/114.16 |
| 2001/0021648 A1 * | 9/2001 | Fougnies et al. | 455/408 |
| 2001/0041555 A1 * | 11/2001 | Lilge | 455/406 |
| 2002/0068554 A1 * | 6/2002 | Dusse | 455/419 |
| 2003/0050041 A1 * | 3/2003 | Wu | 455/406 |
| 2004/0205022 A1 * | 10/2004 | Halford | 705/40 |

OTHER PUBLICATIONS www.hitachi.com/rev/1998/revapr98/r2-108.pdf; Personal Handybook Systems In Urban Infrastructure; 6 pgs.; Hitachi Review, vol. 47 (1998) No. 2.
www.phsmou.or.jp/; PHS MoU Group; PHS MoU Group Start; 2 pgs.; Tokyo 100-0013, Japan; Apr. 13, 2005.
www.phsmou.or.jp/aboutus/index.html; About the PHS Mou; 1 pg.; 14F Nittochi Bldg. 1-4-1 Kasumigaseki, Chiyoda-ku, Toky 100-0013, Japan; Apr. 13, 2005.
www.mpirical.com/companion/mpirical_companion.html#http://www.mpirical.com/companion/M; mpirical companion; 1 pg.; mpirical limited, 200 Brook Drive, Green Park, UK.
www.lucent.com/products/solution/0,,CTID+2014-STID+10450-SOID+1502-LOCL+1,00.html; Lucent-Personal Handyphone System(PHS) for Service Proviers; 3 pgs.; Murray Hill, NJ 07974.

(Continued)

*Primary Examiner*—William D Cumming

(57) ABSTRACT

An apparatus in one example comprises a prepay telephone service system component and a personal handyphone system component. The personal handyphone system component employs the prepay telephone service system component to allow a user of a wireless telephone to execute a purchase of one or more units of wireless telephone service. The personal handyphone system component employs the prepay telephone service system component to allow the user to employ one or more of the one or more units of wireless telephone service with the wireless telephone subsequent to the purchase.

19 Claims, 5 Drawing Sheets

OTHER PUBLICATIONS www.tele.soumu.go.jp/e/system/ml/compare.htm; Comparison of Cellular Telephones and PHS (Personal Handyphone System) in Japan; 2 pgs.; Apr. 13, 2005.

http://networks.siemens.de/solutionprovider/_online_lexikon/3/f010113.htm; Siemens Communication Lexikon-personal handyphone system (PHS); 1 pgs.; Apr. 13, 2005.

www.cjmag.co.jp/magazine/issues/1996/apr96/04phs.html; PHS Phone; Computing Japan Magazine, 9 pgs.; 1996; Apr. 13, 2005.

www.microsoft.com/presspass/press/1999/Oct99/NTTpr.asp; Microsoft and NTT DoCoMo Form Joint Venture to Deliver Mobile Data Services; 2 pgs.; Microsoft Corp, Redmond, VA.

www.ustar.com/Solutions.Wireless/PHS_PAS/; PHS/PAS: Wireless: Solutions; UTSar.com; 3 pgs.; UTStar, 1275 Harbor Way Parkway, Alameda, CA 94502; Apr. 13, 2005.

www.hitachi.com/rev/1995/Review-Aug/HR415.html; Hitachi Review; Aug. 2995, vol. 44-No. 4; 1 pg.

whatis.techtarget.com/definition/0,,sid9_gci214293,00.html; PHS—a Whtatis.com definittion; Whatisc.om. c/o Techtarget, 117 Kendrick Street, Needham, MA 02494, 4 pgs.

www.atip.org/public/atip.reports.96/atip96.026.html; ATIP96.026 Japan's Personal Handyphone System (PHS): Potential for Success; 4 pgs.; www.atip.org.; Apr. 13, 2005.

www..smartcomputing.com/editorial/dictionary/detail.asp; Smart Computing Dictionary Entry-Personal Handyphone System; Smart Computing. webhelp@smartcomputing.com; 1pg; Apr. 13, 2005.

* cited by examiner

PERSONAL HANDYPHONE SYSTEM COMPONENT EMPLOYMENT OF PREPAY TELEPHONE SERVICE SYSTEM COMPONENT TO ALLOW USER EMPLOYMENT OF WIRELESS TELEPHONE SERVICE SUBSEQUENT TO PURCHASE THEREOF

TECHNICAL FIELD

The invention relates generally to communications and more particularly to prepaid wireless communications.

BACKGROUND

Personal handyphone systems ("PHSs") are in operation in various parts of the world, including China and Japan. The personal handyphone systems allow subscribers to place and receive telephone calls while the subscribers are located in specified service areas. In the personal handyphone system, a mobile phone or handset communicates with a base station that is connected to additional mobile phones and the public switched telephone network ("PSTN"). The base station routes calls to and from the mobile phone. The personal handyphone systems require the subscribers to set up personal handyphone system accounts. The personal handyphone system accounts keep track of the calls that the subscribers place or receive. After placing or receiving calls, the subscribers are billed and pay for the personal handyphone system service in conjunction with the calls. One shortcoming of the personal handyphone system is an inability to allow for, and control, a prepaid telephone service system.

A prepaid telephone service system in one example allows code division multiple access ("CDMA") and global system for mobile communications ("GSM") subscribers to pay for wireless communication service in advance of the use of the wireless communication service. The prepaid telephone service system allows subscribers to purchase wireless communication service on a per unit basis. In one example, the prepaid telephone service system allows a telephone user to add to an account balance by purchasing call time minutes, for example, fixed quantities of call time minutes. The prepaid telephone service system tracts the usage of the call time minutes. When all the fixed number of the call time minutes have been used by the subscriber, the subscriber must purchase another fixed number of call time minutes before the subscriber can make another call. In another example, the prepaid telephone service system allows a telephone user to add funds to the account balance that the prepaid telephone service system will convert into call time minutes. One shortcoming of the prepaid telephone service system is an inability to accommodate a subscriber of the personal handyphone system.

Thus, a need exists for an enhanced personal handyphone system.

SUMMARY

The invention in one implementation encompasses an apparatus. The apparatus comprises a prepay telephone service system component and a personal handyphone system component. The personal handyphone system component employs the prepay telephone service system component to allow a user of a wireless telephone to execute a purchase of one or more units of wireless telephone service. The personal handyphone system component employs the prepay telephone service system component to allow the user to employ one or more of the one or more units of wireless telephone service with the wireless telephone subsequent to the purchase.

Another implementation of the invention encompasses a method. There is allowed with a personal handyphone system component a purchase by a user of a wireless telephone of one or more units of wireless telephone service for employment by the user of the wireless telephone of one or more of the one or more units of wireless telephone service with the wireless telephone subsequent to the purchase. The one or more units are added to an account balance of the user of the wireless telephone. One or more of the one or more units are deducted from the account balance based on an amount of wireless telephone service employed by the user during one or more wireless telephone calls with the wireless telephone.

Yet another implementation of the invention encompasses an article. The article comprises one or more computer-readable signal-bearing media. The article comprises means in the one or more media for allowing with a personal handyphone system component a purchase by a user of a wireless telephone of one or more units of wireless telephone service for employment by the user of the wireless telephone of one or more of the one or more units of wireless telephone service with the wireless telephone subsequent to the purchase. The article comprises means in the one or more media for adding the one or more units to an account balance of the user of the wireless telephone. The article comprises means in the one or more media for deducting one or more of the one or more units from the account balance based on an amount of wireless telephone service employed by the user during one or more wireless telephone calls with the wireless telephone.

DESCRIPTION OF THE DRAWINGS

Features of exemplary implementations of the invention will become apparent from the description, the claims, and the accompanying drawings in which:

DETAILED DESCRIPTION

Figure 1:
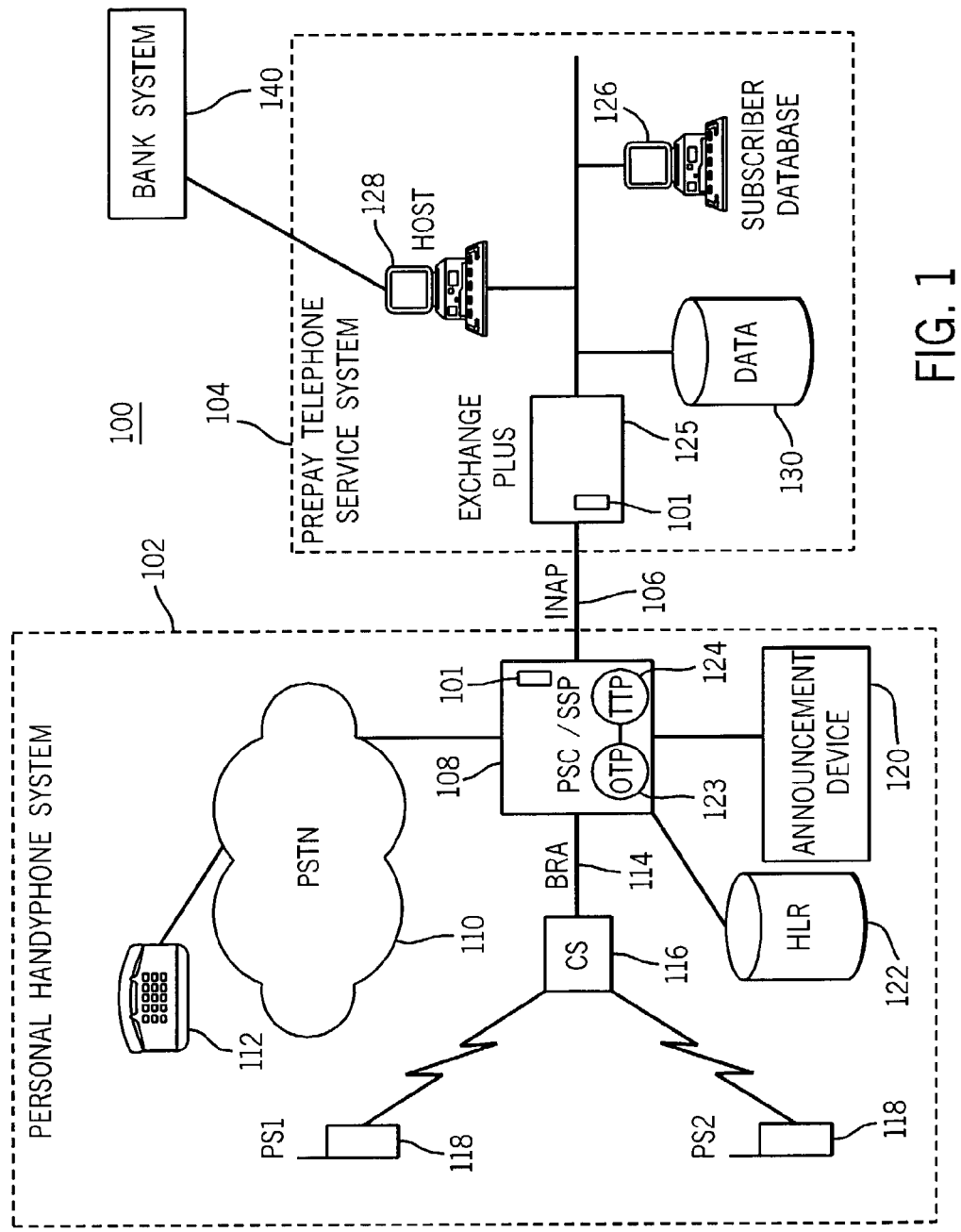
FIG. 1 is a representation of one example of an apparatus that comprises a personal handyphone system coupled with a prepay telephone service system by an intelligent network application protocol link.

Turning to FIG. 1, an apparatus 100 in one example comprises a plurality of components such as computer software and/or hardware components. A number of such components can be combined or divided in the apparatus 100.

In one example, the apparatus 100 employs one or more computer-readable signal-bearing media. One example of a computer-readable signal-bearing medium for the apparatus 100 comprises an instance of a recordable data storage medium 101 such as one or more of a magnetic, electrical, optical, biological, and atomic data storage medium. In another example, a computer-readable signal-bearing medium for the apparatus 100 comprises a modulated carrier signal transmitted over a network comprising or coupled with the apparatus 100, for instance, one or more of a telephone network, a local area network ("LAN"), the internet, and a wireless network. An exemplary component of the apparatus 100 employs and/or comprises a set and/or series of computer instructions written in or implemented with any of a number of programming languages, as will be appreciated by those skilled in the art.

The apparatus 100 in one example comprises a personal handyphone system ("PHS") 102 coupled with a prepay telephone service system 104 by an intelligent network application protocol ("INAP") link 106. The personal handyphone system 102 comprises a personal handyphone system service switch center ("PSC") 108, a public switched telephone network ("PSTN") 110, one or more landline telephones 112, a basic rate access ("BRA") integrated services digital network ("ISDN") link 114, one or more cell stations ("CSs") 116, one or more mobile phones 118, an announcement device 120, and a home location register ("HLR") 122.

The personal handyphone system 102 allows users of the mobile phones 118 to place and receive telephone calls. In addition, the personal handyphone system 102 cooperates with the prepay telephone service system 104 and the intelligent network application protocol link 106 to allow users to execute a purchase of one or more units of wireless telephone service and to employ the mobile phones 118 with one or more of the one or more units of wireless telephone service subsequent to the purchase.

The personal handyphone system service switch center 108 handles all communications between subcomponents of the personal handyphone system 102. The personal handyphone system service switch center 108 serves to couple the public switched telephone network 110, the cell station 116, the announcement device 120, and the home location register 122. The personal handyphone system service switch center 108 in one example comprises a phone system switch. The phone system switch of the personal handyphone system service switch center 108 serves to connect heterogeneous networks. For example, the personal handyphone system service switch center 108 connects different types of voice networks and/or different types of data networks, including connection of voice networks with data networks. The personal handyphone system service switch center 108 serves to allow wireless communication to take place between wireless devices.

The personal handyphone system service switch center 108 employs the intelligent network application protocol link 106 for communicating with the prepay telephone service system 104. For example, the intelligent network application protocol link 106 directly connects the personal handyphone system 102 to the prepay telephone service system 104. A intelligent network application protocol employed by the intelligent network application protocol link 106 allow for a service-independent communications capability.

For example, the personal handyphone system service switch center 108 and a prepay system switch center 125 of the prepay telephone service system 104 comprise computer-controlled switches. So, an operator of the personal handyphone system service switch center 108 and the prepay system switch center 125 may modify network characteristics by modifying software of the personal handyphone system service switch center 108 and the prepay system switch center 125 controlling the switches. The personal handyphone system service switch center 108 employs software. For example, the personal handyphone system service switch center 108 employs service switching point ("SSP") software for generating and interpreting the intelligent network application protocol messages.

The personal handyphone system service switch center 108 comprises a one time password component ("OTP") 123 and a trusted third party component ("TTP") 124. The one time password component 123 is used as proof for authenticating the user or the mobile phones 118. To make a password of the user more secure, the password is encrypted or the encryption is modified so that the encrypted value of the password changes each time the password is used. The trusted third party component 124 employs an authentication technique that relies on a source outside the personal handyphone system 102 to provide authentication.

The basic rate access integrated services digital network link 114 serves to couple the personal handyphone system service switch center 108 with the cell station 116. The cell station 116 employs electromagnetic waves to provide for wireless communication of mobile phones 118. For example, the cell station 116 comprises a base station. The cell station 116 communicates with the mobile phones 118 to transmit calls and messages through the personal handyphone system service switch center 108.

The mobile phone 118 wirelessly communicates with the cell station 116. For example, the mobile phone 118 comprises one or more of a personal handset, a personal station ("PS"), an analog cellular phone, and a digital cellular phone. Users employ one or more of buttons, icons, and touch-screen displays to communicate calls.

The announcement device 120 serves to play announcements to users as directed by the personal handyphone system service switch center 108. For example, the announcement device 120 provides a voice announcement that a called party is busy. The home location register 122 comprises a distributed database that is accessible by multiple personal handyphone system service switch centers 108. The home location register 122 stores all location and service information for the personal handyphone system users.

The public switched telephone network 110 in one example comprises a network of landline telephones 112. A user on the landline telephone 112 dials a number to place a call to a user on the mobile phone 118. The public switched telephone network 110 transmits the call to the personal handyphone system service switch center 108. The personal handyphone system service switch center 108 employs the dialed number to access the home location register 122 to locate the user on the mobile phone 118. The personal handyphone system service switch center 108 routes the call over the basic rate access integrated services digital network link 114 to the cell station 116. The call is broadcast as electromagnetic radiation to the mobile phone 118.

The prepay telephone service system 104 in one example comprises the prepay system switch center 125, a subscriber database 126, a host terminal 128, and a database 130. In one example, the prepay telephone service system 104 comprises a service control point ("SCP"), for example, Exchange Plus. The prepay system switch center 125 serves as a control point of the prepay telephone service system 104. The prepay system switch center 125 comprises one or more protocols employed to exchange messages between the personal handyphone system 102 and the prepay telephone service system 104.

The subscriber database 126 comprises a distributed database that stores location and service information for users of the prepay telephone service system 104. In one example, the subscriber database 126 comprises account information for the users. For example, the subscriber database 126 stores an account balance of the users. The account balance comprises a representation of the units of wireless telephone service remaining in the account of the users. The host terminal 128 comprises an interface with a bank system 140. The host terminal 128 participates in financial transactions with the bank system 140. For example, the host terminal 128 sends a credit/debit card number to the bank system 140 along with a request for a transfer of funds. The bank system 140 replies to the host terminal 128 to indicate the success of the transfer. The database 130 may be used to store additional information or features of the prepay telephone service system 104.

The prepay telephone service system 104 allows a user of the mobile phones 118, landline telephones 112, and/or another telephone to manage services of the prepay wireless telephone service. The user can call a service telephone number to make selections from a list of features and/or options. Examples of the features comprise a user-defined notification of balance level of the account, a user check on the balance level of the account, a user-defined maximum monthly deduction from the account, a user-defined notification of call cancellation upon occurrence of a zero balance for the account, a user-initiated addition of one or more units of wireless telephone service to the account, automatic update of the account balance at a user-selected time interval, a user-controlled security lock on the account, a user-defined friends and family list for wireless calls at a discounted rate, allowance of predefined toll-free calls without deduction from the balance level of the account, a user-controlled password on the account.

An illustrative description of exemplary operation of the apparatus 100 is now presented, for explanatory purposes. A user initiates a call with the mobile phone 118. The mobile phone 118 transmits the call as electromagnetic radiation to the cell station 116. The cell station 116 sends the call to the personal handyphone system service switch center 108 through the basic rate access integrated data services network link 114. The call is placed on hold in the personal handyphone system service switch center 108 while the personal handyphone system service switch center 108 generates an account balance query. The account balance query is placed into an intelligent network application protocol operation message. The personal handyphone system service switch center 108 sends the intelligent network application protocol operation message over the intelligent network application protocol link 106 to the prepay telephone service system 104.

The prepay system switch center 125 receives the intelligent network application protocol operation message from the intelligent network application protocol link 106. The prepay system switch center 125 converts the intelligent network application protocol operation message into a query message appropriate for forwarding within the prepay telephone service system 104. The prepay system switch center 125 analyzes the query message to determine a path to route the query message. In one example, the query message is sent to the subscriber database 126. The subscriber database 126 verifies the account balance of the user is above a preselected value to fund the call. The subscriber database 126 generates a reply message that indicates the account balance of the user. The subscriber database 126 sends the reply message to the prepay system switch center 125. The prepay system switch center 125 receives the reply message and places the reply message into an intelligent network application protocol operation message. The prepay system switch center 125 sends the intelligent network application protocol operation message over the intelligent network application protocol link 106 to the personal handyphone system 102.

The personal handyphone system service switch center 108 receives the intelligent network application protocol operation message from the intelligent network application protocol link 106. The personal handyphone system service switch center 108 analyzes the intelligent network application protocol operation message to determine whether to connect the call to the public switched telephone network 110. If the intelligent network application protocol operation message indicates the account balance of the user is above the preselected value, then the call is connected to the public switched telephone network 110. The public switched telephone network 110 connects the call to an intended recipient of the call, for example, at the landline telephone 112.

Figure 2:
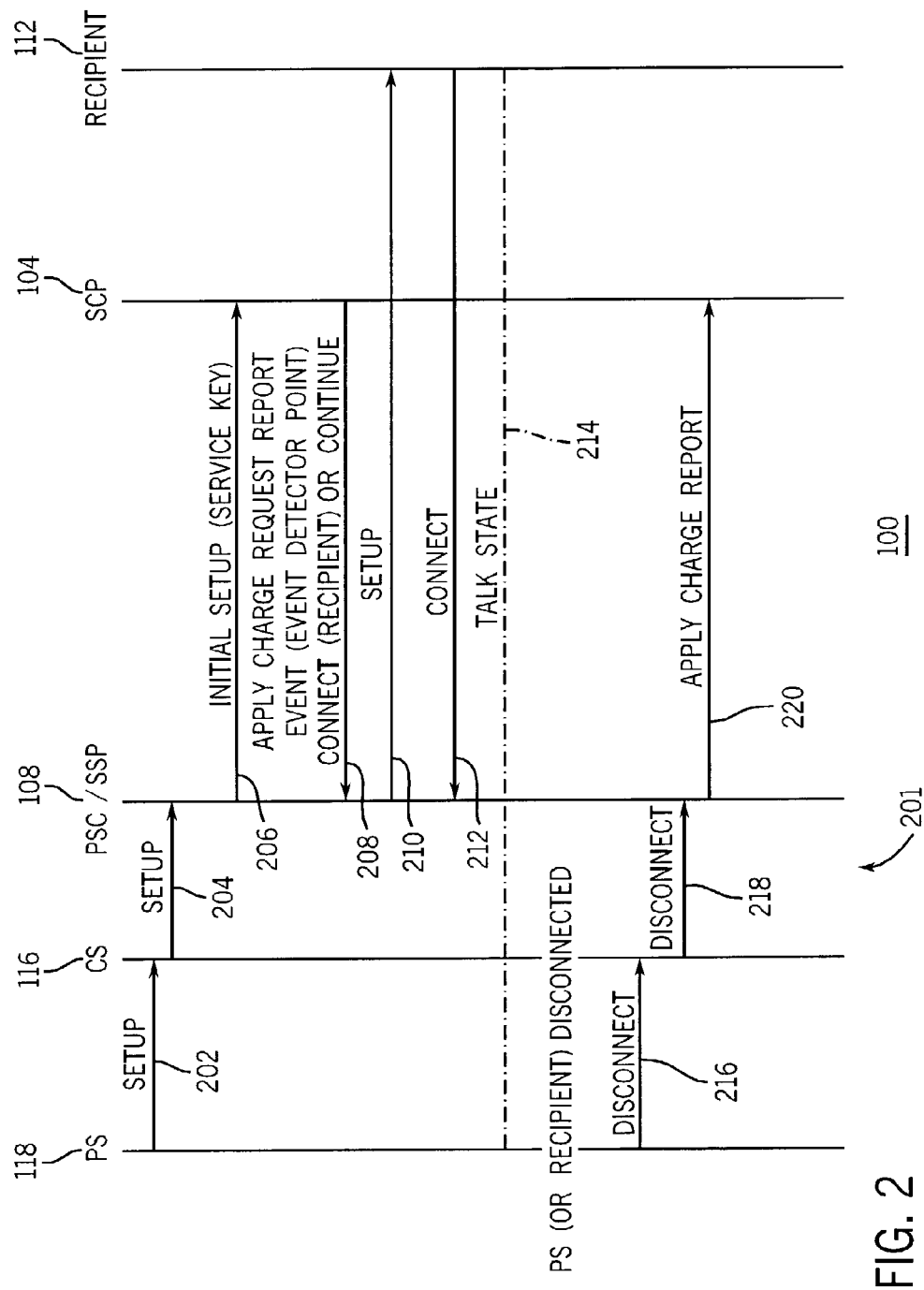
FIG. 2 is a representation of an exemplary message flow for a call from a mobile phone of the personal handyphone system to another phone of the personal handyphone system of the apparatus of FIG. 1.

Turning to FIG. 2, a call flow 201 represents exemplary connection of a call from the mobile phone 118 to the landline telephone 112. A user of the prepay telephone service system 104 initiates a call with the mobile phone 118. The mobile phone 118 sends a setup message 202 to the cell station 116. The setup message 202 comprises the phone number of the mobile phone 118 and the phone number of the landline telephone 112. The cell station 116 sends a setup message 204 to the personal handyphone system service switch center 108. The personal handyphone system service switch center 108 employs the one time password component 123 and/or the trusted third party component 124 to authenticate the call. The personal handyphone system service switch center 108 queries the home location register 122 to determine if the user of the mobile phone 118 subscribes to the prepay telephone service system 104. If the user of the mobile phone 118 does not subscribe to the prepay telephone service system 104, then the call is connected to the public switched telephone network 110. If the user of the mobile phone 118 does subscribe to the prepay telephone service system 104, then the personal handyphone system service switch center 108 holds the call while generating and sending a query message 206 to the prepay telephone service system 104. In one example, the query message 206 comprises message Initial Setup (Service Key). The message Initial Setup comprises a communication setup message between the mobile phone 118 and the landline telephone 112. The query message 206 comprises an identifier of the mobile phone 118 and an identifier of a destination of the call. For example, the Service Key comprises the identifier of the mobile phone 118 and the identifier of the destination of the call. In one example, the identifier of the mobile phone 118 comprises the phone number of the mobile phone 118 and the identifier of the destination of the call comprises the phone number of the landline telephone 112.

The prepay telephone service system 104 employs the identifier of the mobile phone 118 to access the account balance of the user. The prepay telephone service system 104 will generate a reply message 208 to send the account balance to the personal handyphone system service switch center 108. In one example, the reply message 208 comprises messages Apply Charge, Request Report Event (Event Detector Point), and Connect (Recipient) or Continue. The Apply Charge message comprises a charge class, a charge rate, a surcharge, call supervision, and a heartbeat time. The Request Report Event (Event Detector Point) message sets up a monitoring system of the call errors from disconnections at the Event Detector Point. If the number of the recipient of the call needs to be changed, then the Connect (Recipient) message provides the phone number of the Recipient to the personal handyphone system service switch center 108. If the number of the recipient of the call does not need to be changed, then the Continue message notifies the personal handyphone system service switch center 108 that the number of the recipient of the call does not need to be changed.

If the account balance is above a preselected value, then the call is validated and the personal handyphone system service switch center 108 routes the call to the landline telephone 112. Once the call is validated, the personal handyphone system service switch center 108 sends a setup message 210 to initiate a connection with the landline telephone 112. If the connection is successful, then the landline telephone 112 sends a connect message 212 to the personal handyphone system service switch center 108. The call is now in a connection state for example a talk state 214.

The talk state 214 is ended when the call experiences a disconnection by the mobile phone 118 or the landline telephone 112. After the disconnection, the mobile phone 118 sends a disconnect message 216 to the cell station 116. The cell station 116 sends a disconnect message 218 to the personal handyphone system service switch center 108. The personal handyphone system service switch center 108 generates and sends a charge report message 220 to the prepay telephone service system 104. In one example, the charge report message 220 comprises a message Apply Charge Report. The charge report message 220 comprises an amount to deduct from the account balance of the user. In one example, the charge report message 220 comprises the phone number of the mobile phone 118, the phone number of the landline telephone 112, start time of the call, end time of the call, call duration, call cost, and disconnection reason. The prepay telephone service system 104 updates the account balance of the user in the subscriber database 126 and stores a record of the charge report message 220 in the database 130.

Figure 3:
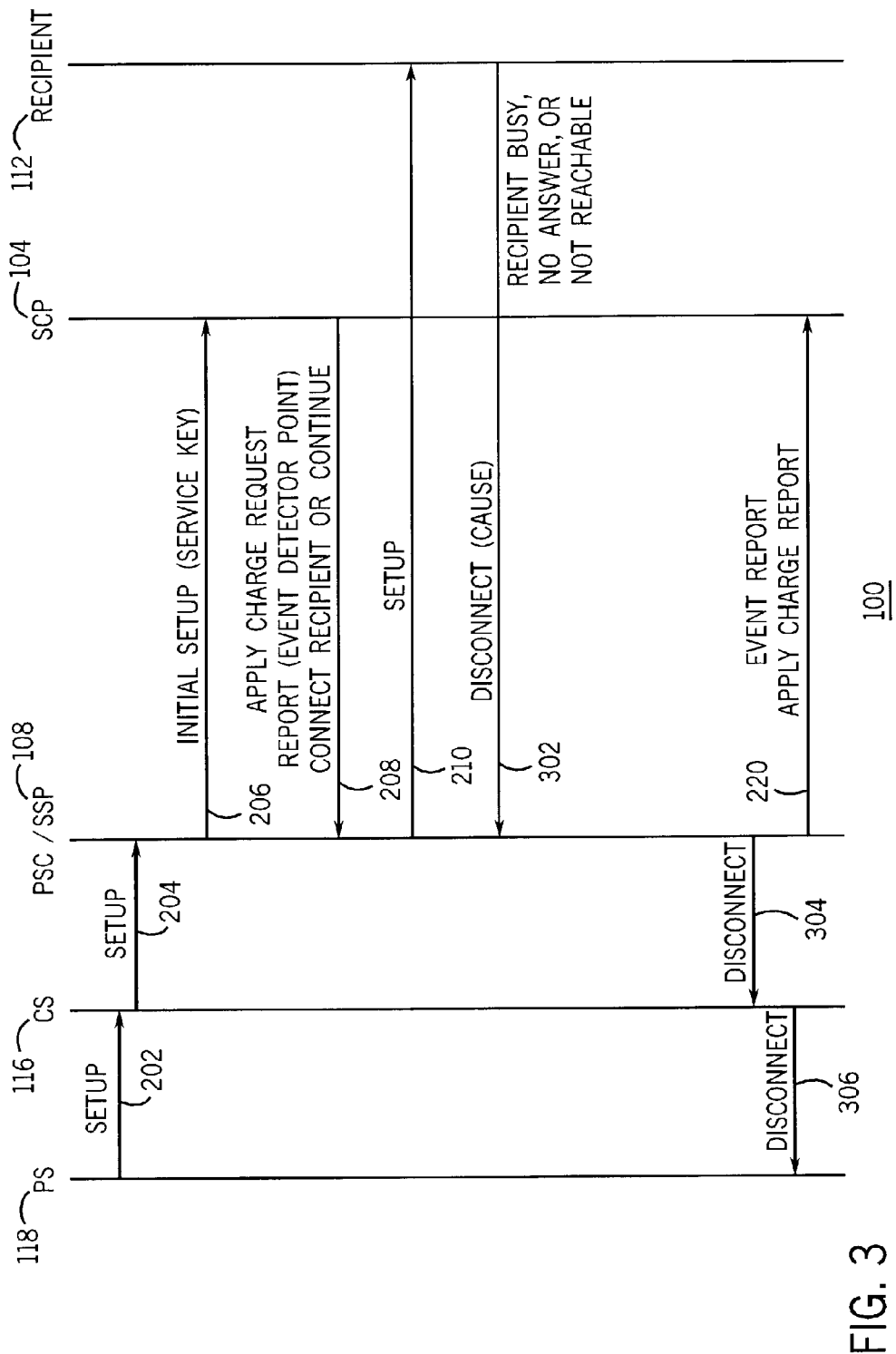
FIG. 3 is a representation of an exemplary message flow for a failed call connection from a mobile phone of the personal handyphone system to another phone of the personal handyphone system of the apparatus of FIG. 1.

Turning to FIG. 3, a call flow 301 represents exemplary failure during connection of a call from the mobile phone 118 to the landline telephone 112. A user of the prepay telephone service system 104 initiates a call with the mobile phone 118. The mobile phone 118 sends the setup message 202 to the cell station 116. The cell station 116 sends the setup message 204 to the personal handyphone system service switch center 108. If the mobile phone 118 subscribes to the prepay telephone service system 104, then the personal handyphone system service switch center 108 generates and sends the query message 206 to the prepay telephone service system 104. In one example, the query message 206 comprises message Initial setup (Service Key). The message Initial setup (Service Key) in the call flow 301 is analogous the message Initial setup (Service Key) in the call flow 201. The prepay telephone service system 104 will generate the reply message 208 to send the account balance to the personal handyphone system service switch center 108. The personal handyphone system service switch center 108 sends the setup message 210 to initiate a connection with the landline telephone 112.

If the connection is not successful, then the landline telephone 112 sends a disconnect message 302 to the personal handyphone system service switch center 108. The disconnect message 302 comprises a message Disconnect (Cause). The disconnect message 302 returns the reason for the connection failure to the personal handyphone system service switch center 108. The Cause comprises the reason for the connection failure. The connection fails in situations when the landline telephone 112 is busy, does not answer, or is not reachable. The personal handyphone system service switch center 108 sends a disconnect message 304 to the cell station 116. The cell station 116 sends a disconnect message 306 to the mobile phone 118. The personal handyphone system service switch center 108 sends the charge report message 220 to the prepay telephone service system 104. The charge report message 220 comprises messages Event Report and Apply Charge Report. The Event Report message delivers the reason for connection failure to the prepay telephone service system 104. The Apply Charge Report message comprises a number of units to deduct from the account balance of the user. However, since the connection failed the database 130 does not record the Apply Charge Report message and the subscriber database 126 does not deduct the number of units from the account balance of the user.

Figure 4:
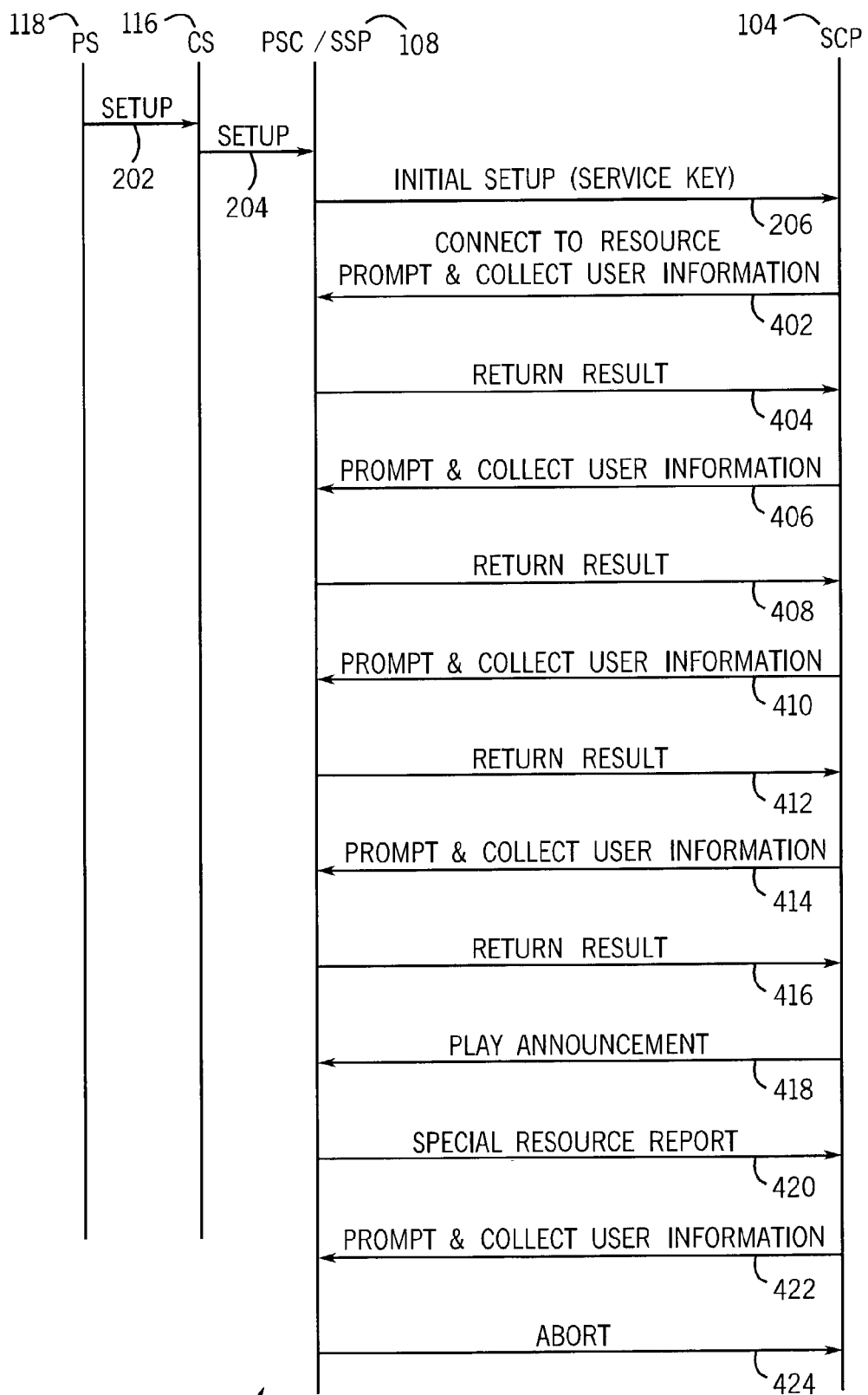
FIG. 4 is a representation of an exemplary message flow for an account management call to the prepay telephone service system of the apparatus of FIG. 1.

Turning to FIG. 4, a call flow 401 represents an exemplary account management call. In one example, the account management call comprises a call to add one or more units of wireless telephone service to the account balance of a user of the prepay telephone service system 104. The user initiates the account management call with the mobile phone 118 by dialing a service number. The mobile phone 118 sends the setup message 202 to the cell station 116. The cell station 116 sends the setup message 204 to the personal handyphone system service switch center 108. The personal handyphone system service switch center 108 generates and sends the query message 206 to the prepay telephone service system 104. In one example, the query message 206 comprises message Initial setup (Service Key). The message Initial setup (Service Key) in the call flow 401 is analogous the message Initial setup (Service Key) in the call flow 201.

The prepay telephone service system 104 recognizes that the call is a management call and sends an announcement message 402 to the personal handyphone system service switch center 108. In one example, the announcement message 402 comprises messages Connect To Resource and Prompt and Collect User Information. The Connect To Resource and Prompt and Collect User Information messages present the user with one or more management options available during the management call. For example, the user makes a choice from the one or more management options to add funds to the account balance. The personal handyphone system service switch center 108 sends the choice in a reply message 404 to the prepay telephone service system 104. In one example, the reply message 404 comprises message Return Result.

The prepay telephone service system 104 sends an announcement message 406 to the personal handyphone system service switch center 108. In one example, the announcement message 406 comprises message Prompt and Collect User Information. The announcement message 406 requests additional information from the user for example the phone number of the mobile phone 118. The user enters the phone number of the account. The personal handyphone system service switch center 108 sends the phone number in a reply message 408 to the prepay telephone service system 104. In one example, the reply message 408 comprises message Return Result.

The prepay telephone service system 104 sends an announcement message 410 to the personal handyphone system service switch center 108. In one example, the announcement message 410 comprises message Prompt and Collect User Information. The announcement message 410 comprises a message to request confirmation of the phone number. The personal handyphone system service switch center 108 sends the confirmation in a reply message 412 to the prepay telephone service system 104.

The prepay telephone service system 104 sends an announcement message 414 to the personal handyphone system service switch center 108. In one example, the announcement message 414 comprises message Prompt and Collect User Information. The announcement message 414 requests from the user additional information, for example, a prepaid service purchase number. The prepaid service purchase number for example comprises a confirmation number from a prepaid wireless telephone service phone card representing a purchase of one or more units of wireless telephone service. The personal handyphone system service switch center 108 sends the prepaid service purchase number in a reply message 416 to the prepay telephone service system 104. In one example, the reply message 416 comprises message Return Result.

The prepay telephone service system 104 sends an announcement message 418 to the personal handyphone system service switch center 108. In one example, the announcement message 418 comprises message Play Announcement. The announcement message 418 presents the user with the account balance and an expiration date of the account balance. The personal handyphone system service switch center 108 sends confirmation in a reply message 420 to the prepay telephone service system 104. In one example, the reply message 420 comprises message Special Resource Report.

The prepay telephone service system 104 sends an announcement message 422 to the personal handyphone system service switch center 108. In one example, the announcement message 422 comprises message Prompt and Collect User Information. The announcement message 422 presents the user with one or more management options available during the management call. The user hangs up disconnecting the mobile phone 118 from the prepay telephone service system 104. The personal handyphone system service switch center 108 sends a disconnect message 424 to the prepay telephone service system 104. In one example, the disconnect message 424 comprises message Abort.

Figure 5:
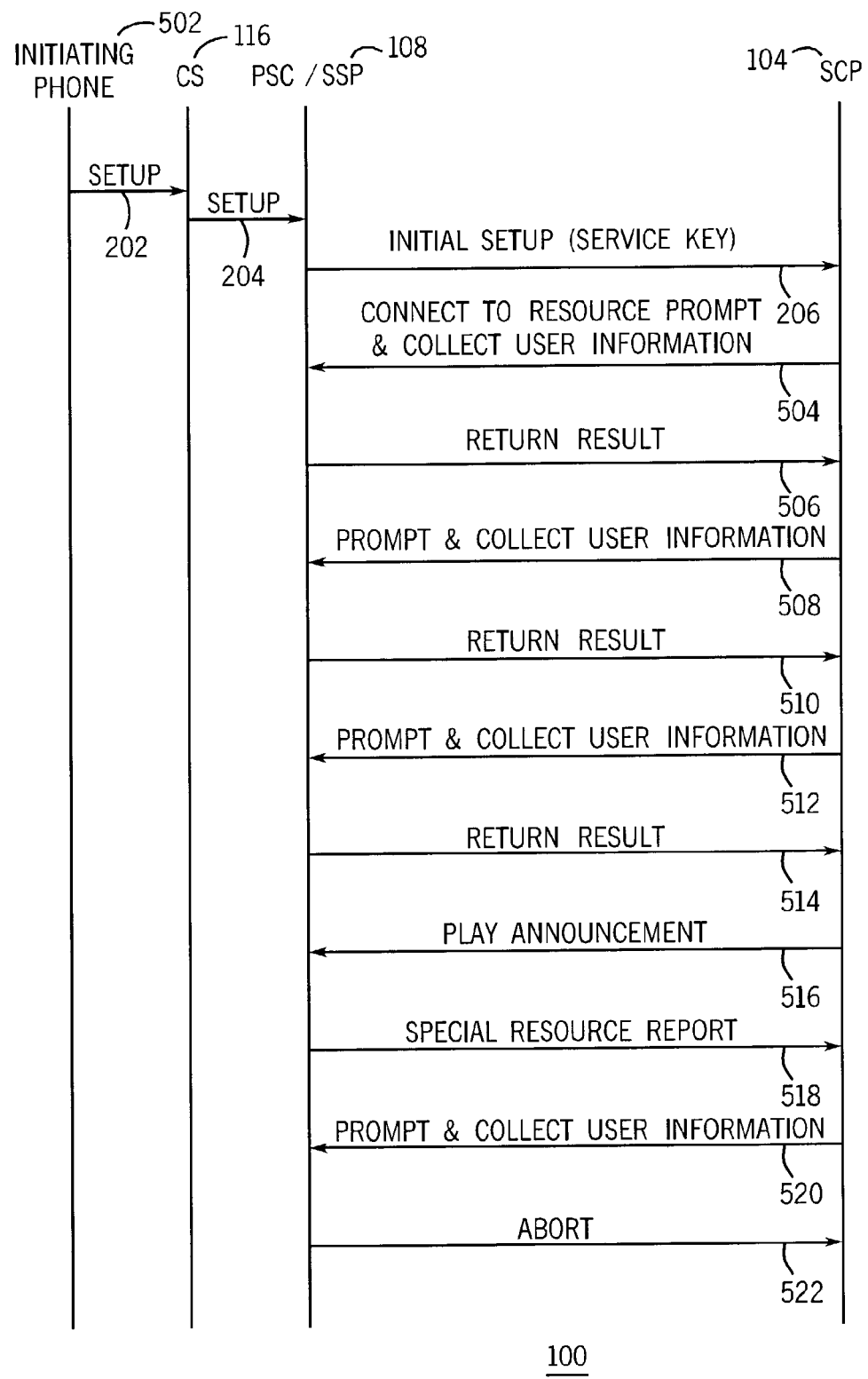
FIG. 5 is a representation of an exemplary message flow for another account management call to the prepay telephone service system of the apparatus of FIG. 1.

Turning to FIG. 5, a call flow 501 represents another exemplary account management call. In one example, the account management call comprises a call to lock the account of a user of the prepay telephone service system 104. The user initiates the account management call with a phone 502 by dialing a service number. The phone 502 can be any telephone, but call flow 501 assumes in this example that the phone 502 is a telephone that subscribes to the personal handyphone system. The phone 502 sends the setup message 202 to the cell station 116. The cell station 116 sends the setup message 204 to the personal handyphone system service switch center 108. The personal handyphone system service switch center 108 generates and sends the query message 206 to the prepay telephone service system 104. In one example, the query message 206 comprises message Initial setup (Service Key). The message Initial setup (Service Key) in the call flow 501 is analogous the message Initial setup (Service Key) in the call flow 201.

The prepay telephone service system 104 recognizes that the call is a management call and sends an announcement message 504 to the personal handyphone system service switch center 108. In one example, the announcement message 504 comprises messages Connect To Resource and Prompt and Collect User Information. The Connect To Resource and Prompt and Collect User Information messages present the user with one or more management options available during the management call. For example, the user makes a choice from the one or more management options to lock the account of the mobile phone 118. The personal handyphone system service switch center 108 sends the choice in a reply message 506 to the prepay telephone service system 104. In one example, the reply message 506 comprises message Return Result.

The prepay telephone service system 104 sends an announcement message 508 to the personal handyphone system service switch center 108. In one example, the announcement message 508 comprises message Prompt and Collect User Information. The announcement message 508 requests additional information from the user, for example, the phone number of the mobile phone 118 to be locked. The user enters the phone number and the personal handyphone system service switch center 108 sends the phone number in a reply message 510 to the prepay telephone service system 104. In one example, the reply message 510 comprises message Return Result.

The prepay telephone service system 104 sends an announcement message 512 to the personal handyphone system service switch center 108. In one example, the announcement message 512 comprises message Prompt and Collect User Information. The announcement message 512 requests additional information from the user, for example, a personal identification number. The personal handyphone system service switch center 108 sends the personal identification number in a reply message 514 to the prepay telephone service system 104. In one example, the reply message 514 comprises message Return Result.

The prepay telephone service system 104 sends an announcement message 516 to the personal handyphone system service switch center 108 to confirm a successful lock of the mobile phone 118. In one example, the announcement message 516 comprises message Play Announcement. The personal handyphone system service switch center 108 sends confirmation in a reply message 518 to the prepay telephone service system 104. In one example, the reply message 518 comprises message Special Resource Report.

The prepay telephone service system 104 sends an announcement message 520 to the personal handyphone system service switch center 108. In one example, the announcement message 520 comprises message Prompt and Collect User Information. The announcement message 520 presents the user with one or more management options available during the management call. The user hangs up disconnecting the mobile phone 118 from the prepay telephone service system 104. The personal handyphone system service switch center 108 sends a disconnect message 522 to the prepay telephone service system 104. In one example, the disconnect message 522 comprises message Abort.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. An apparatus, comprising:
a prepay telephone service system component; and
a personal handyphone system service switch center of a personal handyphone system;
wherein the personal handyphone system service switch center comprises service switching point software for generation and interpretation of intelligent network application protocol messages;
wherein the personal handyphone system service switch center employs the service switching point software to exchange intelligent network application protocol messages with the prepay telephone service system component;

wherein the personal handyphone system service switch center employs the prepay telephone service system component to allow a user of a wireless telephone to execute a purchase of one or more units of wireless telephone service, wherein the personal handyphone system service switch center employs the prepay telephone service system component to allow the user to employ one or more of the one or more units of wireless telephone service with the wireless telephone subsequent to the purchase;

wherein the personal handyphone system service switch center comprises a trusted third party component configured to authenticate the user of the wireless telephone through employment of an authentication technique that relies on a source outside the personal handyphone system;

wherein the prepay telephone service system component stores account information for the user of the wireless telephone, wherein the account information comprises an account balance for the user of the wireless telephone, wherein the account balance is based on the one or more units of wireless telephone service;

wherein upon initiation by the user of a request to place a wireless telephone call with the wireless telephone the personal handyphone system service switch center receives the request and initiates a query of the prepay telephone service system component, wherein in response to the query the prepay telephone service system component returns to the personal handyphone system service switch center a reply that comprises the account balance for the user of the wireless telephone;

wherein upon determination by the personal handyphone system service switch center that the account balance is above a preselected threshold the personal handyphone system service switch center allows the user to place the wireless telephone call with the wireless telephone.

2. The apparatus of claim 1, wherein the prepay telephone service system component employs the intelligent network application protocol to communicate to the personal handyphone system service switch center the account balance for the user of the wireless telephone.

3. The apparatus of claim 1, wherein the personal handyphone system service switch center places the query into a first intelligent network application protocol operation message through employment of the service switching point software, wherein the personal handyphone system service switch center sends the first intelligent network application protocol operation message to the prepay telephone service system component;

wherein the prepay telephone service system component places the account balance for the user of the wireless telephone in a second intelligent network application protocol operation message, wherein the prepay telephone service system component sends the second intelligent network application protocol operation message to the personal handyphone system service switch center.

4. The apparatus of claim 1, wherein the prepay telephone service system component comprises a service control point;

wherein the personal handyphone system service switch center employs the service switching point software to communicate with the service control point;

wherein the service switching point software of the personal handyphone system service switch center and the service control point generate and interpret intelligent network application protocol messages that comprise the query and the reply.

5. The apparatus of claim 1, wherein upon placement of a wireless telephone call by the user of the wireless telephone the prepay telephone service system component deducts one or more of the one or more units from the account balance of the user of the wireless telephone based on the wireless telephone call.

6. The apparatus of claim 1, wherein upon execution of a wireless telephone call by the user of the wireless telephone the prepay telephone service system component calculates a charge rate for the wireless telephone call, wherein the prepay telephone service system component deducts one or more of the one or more units from the account balance of the user of the wireless telephone based on the charge rate.

7. The apparatus of claim 6, wherein the prepay telephone service system component calculates the charge rate for the wireless telephone call, wherein the prepay telephone service system component sends the charge rate to the personal handyphone system service switch center;

wherein upon completion of the wireless telephone call the personal handyphone system service switch center generates and sends a billing report to the prepay telephone service system component, wherein the prepay telephone service system component employs the billing report to deduct one or more of the one or more units of wireless telephone service from the account balance.

8. The apparatus of claim 6, wherein upon completion of the wireless telephone call the personal handyphone system service switch center sends a notification to the prepay telephone service system component, wherein in response to the notification the prepay telephone service system component deducts one or more of the one or more units of wireless telephone service from the account balance and generates a billing report.

9. The apparatus of claim 1, wherein the prepay telephone service system component comprises a normal operation mode and a locked mode, wherein the prepay telephone service system component in the normal operation mode serves to allow an attempt by the user to place a wireless telephone call from the wireless telephone, wherein the prepay telephone service system component in the locked mode serves to terminate an attempt by the user to place a wireless telephone call from the wireless telephone.

10. The apparatus of claim 1, wherein upon complete expenditure of the one or more units of wireless telephone service during a wireless telephone call the prepay telephone service system component serves to terminate the wireless telephone call.

11. The apparatus of claim 1, wherein the prepay telephone service system component comprises an account for the user of the wireless telephone, wherein the prepay telephone service system component allows for management by the user of one or more features of the account.

12. The apparatus of claim 11, wherein upon a call from the user to a service number the prepay telephone service system component allows the user to gain access to the one or more features of the account;

wherein the prepay telephone service system component allows the user to modify the one or more features of the account.

13. The apparatus of claim 11, wherein the one or more features of the account comprise one or more of:
a user-defined notification of balance level of the account;
a user check on the balance level of the account;
a user-defined maximum monthly deduction from the account;
a user-defined notification of call cancellation upon occurrence of a zero balance for the account;

a user-initiated addition of one or more units of wireless telephone service to the account;

automatic update of the account balance at a user-selected time interval;

a user-controlled security lock on the account;

a user-defined friends and family list for wireless calls at a discounted rate;

allowance of predefined toll-free calls without deduction from the balance level of the account; and a user-controlled password on the account.

14. A method, comprising the steps of:

allowing with a personal handyphone system service switch center of a personal handyphone system a purchase, by a user of a first wireless telephone, of one or more units of wireless telephone service for employment by the user of the first wireless telephone of one or more of the one or more units of wireless telephone service with the first wireless telephone subsequent to the purchase;

authenticating the purchase through employment of a trusted third party component of the personally handyphone system service switch center, wherein the trusted third party component is configured to authenticate the user of the first wireless telephone through employment of an authentication technique that relies on a source outside the personal handyphone system;

sending, by service switching point software of the personal handyphone system service switch center, an account management call to a prepay telephone service system component;

adding the one or more units to an account balance of the user of the first wireless telephone; and deducting one or more of the one or more units from the account balance based on an amount of wireless telephone service employed by the user during one or more wireless telephone calls with the first wireless telephone;

receiving a setup message for a call from a second wireless telephone;

authenticating the call through employment of a one time password component;

querying a home location register to determine if a user of the second wireless telephone subscribes to a prepay telephone service system;

connecting the call to a public switched telephone network if the user of the second wireless telephone does not subscribe to the prepay telephone service system;

holding the call if the user of the second wireless telephone does subscribe to the prepay telephone service system;

sending a query message to the prepay telephone service system;

receiving a reply message from the prepay telephone service system;

connecting the call to the public switched telephone network upon validation of the call through employment of the reply message.

15. The method of claim 14, wherein the step of allowing with the personal handyphone system service switch center the purchase by the user of the wireless telephone of the one or more units of wireless telephone service for employment by the user of the wireless telephone of the one or more of the one or more units of wireless telephone service with the wireless telephone subsequent to the purchase comprises the step of:

allowing the user to add one or more of the one or more units to the account balance through a purchase of a prepaid wireless telephone service phone card and an input of a confirmation number of the prepaid wireless telephone service phone card to a management phone number of the personal handyphone system.

16. The method of claim 14, wherein the step of allowing the purchase of the one or more units of wireless telephone service for use subsequent to the purchase by the user of the wireless telephone in the personal handyphone system service switch center comprises the steps of:

accessing a financial account with the personal handyphone system service switch center; and automatically transferring with the personal handyphone system service switch center funds from the financial account to the account balance when the account balance decreases to a preselected amount.

17. The method of claim 14, wherein the step of deducting the one or more of the one or more units from the account balance based on the amount of wireless telephone service employed by the user during the one or more wireless telephone calls with the wireless telephone comprises the steps of:

calculating a charge rate for a wireless telephone call of the one or more wireless telephone calls based on one or more characteristics of the wireless telephone call;

calculating a number of units of wireless telephone service to deduct from the account balance based on the charge rate; and deducting the number of units from the account balance.

18. An article, comprising:

a program embodied in one or more computer-readable signal-bearing media; and means in the one or more media for allowing with a personal handyphone system service switch center of a personal handyphone system a purchase, by a user of a first wireless telephone, of one or more units of wireless telephone service for employment by the user of the first wireless telephone of one or more of the one or more units of wireless telephone service with the first wireless telephone subsequent to the purchase;

means in the one or more media for authenticating the purchase through employment of a trusted third party component of the personally handyphone system service switch center, wherein the trusted third party component is configured to authenticate the user of the first wireless telephone through employment of an authentication technique that relies on a source outside the personal handyphone system;

means in the one or more media for sending, by service switching point software of the personal handyphone system service switch center, an account management call to a prepay telephone service system component;

means in the one or more media for adding the one or more units to an account balance of the user of the first wireless telephone; and means in the one or more media for deducting one or more of the one or more units from the account balance based on an amount of wireless telephone service employed by the user during one or more wireless telephone calls with the first wireless telephone;

means in the one or more media for receiving a setup message for a call from a second wireless telephone;

means in the one or more media for authenticating the call through employment of a one time password component;

means in the one or more media for querying a home location register to determine if a user of the second wireless telephone subscribes to a prepay telephone service system;

means in the one or more media for connecting the call to a public switched telephone network if the user of the second wireless telephone does not subscribe to the prepay telephone service system;

means in the one or more media for holding the call if the user of the second wireless telephone does subscribe to the prepay telephone service system;

means in the one or more media for sending a query message to the prepay telephone service system;

means in the one or more media for receiving a reply message from the prepay telephone service system;

means in the one or more media for connecting the call to the public switched telephone network upon validation of the call through employment of the reply message.

19. The apparatus of claim 1, wherein upon execution of a wireless telephone call by the user of the wireless telephone the prepay telephone service system component employs a one time password component to authenticate the wireless telephone call.

* * * * *